W. W. Tice,
Molders' Clamp.
№ 60,091.          Patented Nov. 27, 1866.
Fig. 1.
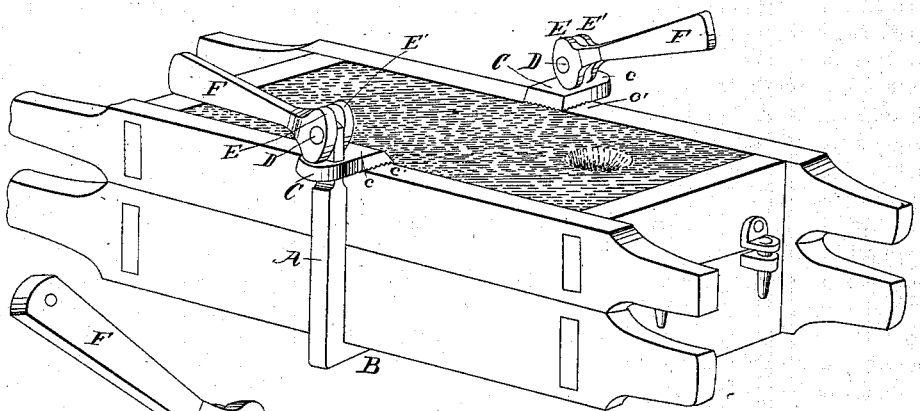
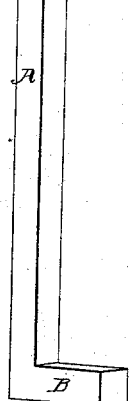
Fig. 2.
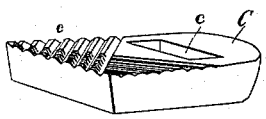
Fig. 3.
Witnesses;
Frank Millward
James H. Layman
Inventor;
W. W. Tice
Per. Knight Bro
Attys.

United States Patent Office.

IMPROVED MOULDER'S CLAMP.

WILLIAM W. TICE, OF CALIFORNIA, OHIO.

Letters Patent No. 60,091, dated November 27, 1866.

SPECIFICATION.

TO ALL WHOM IT MAY CONCERN:

Be it known that I, WILLIAM W. TICE, of California, Hamilton county, Ohio, have invented a new and useful Moulder's Clamp; and I do hereby declare the following to be a full, clear, and exact description thereof, reference being had to the accompanying drawings, making part of this specification.

My invention relates to an effective clamp for moulders' flasks, which, while more quickly and easily applied than the ordinary clamps, does not, like the latter, tend to mar and bruise the edge of the flask.

Figure 1 shows two of my clamps in place upon a flask.

Figure 2 is an enlarged and perspective view of my clamp detached.

Figure 3 shows my guard detached.

A is the shank of a hook, B, similar to that of an ordinary clamp. The shank A, at its upper end, $a$, is somewhat reduced in size to enter a square or oblong aperture, $c$, in a slab, C, which I call the guard. The slab C projects laterally on the same side of the shank as the hook B, and is scored or roughened, $c'$, on the under side of said projecting part. Hinged, D, to the extreme end of the shank A, above the guard C, is a cam-headed lever, E E' F, whose head, E E', bearing upon the top of the guard, presses it toward the hook as the lever F is depressed. The cam-head is bifurcated into two equal and similar parts or members, E and E', so as to bear equally and squarely upon the guard on both sides of the shank, and to enable the guard to be pressed bodily and truly down upon the edge of the flask without canting.

I claim, herein, as new and of my invention—

The moulder's clamp, composed of the hook A B, guard C, and cam-headed lever E E' F.

In testimony of which invention I hereunto set my hand.

WILLIAM W. TICE.

Witnesses:
GEO. H. KNIGHT.
JAMES H. LAYMAN.